United States Patent [19]

Aubert

[11] 4,092,216
[45] May 30, 1978

[54] NUCLEAR REACTOR

[75] Inventor: Gilles Aubert, Orsay, France

[73] Assignee: Commissariat a l'Energie Atomique, Paris, France

[21] Appl. No.: 683,528

[22] Filed: May 5, 1976

Related U.S. Application Data

[63] Continuation-in-part of Ser. No. 529,905, Dec. 5, 1974, abandoned.

[30] Foreign Application Priority Data

Dec. 14, 1973 France .................................. 73 44815

[51] Int. Cl.² ............................................. G21C 1/04
[52] U.S. Cl. .................................. 176/50; 176/36 R; 176/61
[58] Field of Search .................. 176/33, 36 R, 86 R, 176/50, 61, 78, 87

[56] References Cited

U.S. PATENT DOCUMENTS

| 3,361,639 | 1/1968 | Ashcroft et al. | 176/78 |
| 3,607,629 | 9/1971 | Frish et al. | 176/36 R |
| 3,816,245 | 6/1974 | Bevilacqua | 176/87 |
| 3,817,829 | 6/1974 | Frisch et al. | 176/36 R |
| 3,836,429 | 9/1974 | Frisch et al. | 176/33 |
| 3,853,703 | 12/1974 | Anthony et al. | 176/50 |
| 3,855,060 | 12/1974 | Dietrich et al. | 176/36 R |

Primary Examiner—Harvey E. Behrend
Attorney, Agent, or Firm—Lane, Aitken, Dunner & Ziems

[57] ABSTRACT

A device for guiding control rods of the absorber-pin cluster type and placed above the reactor core comprises a rigid top plate applied against the reactor vessel and provided with openings joined to long vertical tubes in which the control rod assembly is slidably mounted, an intermediate plate below coolant outlets for the sliding displacement of each absorber pin through corresponding apertures in said plate, and short connecting tubes which preferably provide a mechanical connection between the intermediate plate and a bottom plate and serve to guide the absorber pins, or alternatively short connecting tubes which guide the absorber pins and support members rigidly connected between the plates.

7 Claims, 6 Drawing Figures

NUCLEAR REACTOR

This application is a continuation of Ser. No. 529,905 filed 12/15/74, now abandoned.

BACKGROUND OF THE INVENTION

This invention relates to a nuclear reactor of the type comprising control rods designed in the form of so-called "pin clusters".

In more exact terms, this invention is more especially concerned with a device for guiding nuclear reactor control rods consisting of pin clusters.

A prior art control rod of the pin-cluster type is shown in perspective in FIG. 1 and is constituted by a plurality of absorber pins such as the pin 2 which are disposed in parallel relation and located with a high degree of accuracy. The material employed for the fabrication of these pins must clearly be capable of absorbing the neutrons which take part in the nuclear reaction. The absorber pins 2 are rigidly fixed to the guide stem 4 by means of a so-called "spider" which is constituted by a plurality of radial ribs such as the rib 6. Said ribs are rigidly fixed on the one hand to the guide stem 4 and on the other hand to the upper extremities of each absorbor pin 2. In order to adjust the reactivity of the reactor, that is to say in order to set the neutron flux within the reactor core at a given level, the absorber pins 2 are inserted to a greater or lesser depth within channels formed in the fuel assemblies of the reactor core. This operation is obtained by producing action on the guide stem 4.

It is apparent that the absorber pins 2 have a length which is substantially equal to the height of the reactor core. Furthermore, said pins are attached to the guide stem only at their upper extremities and said absorber pins must be completely withdrawn from the fuel element channels in order to obtain maximum reactivity. It is therefore clearly necessary to guide these absorber pins 2 outside the fuel assemblies in order that they can be readily inserted into said channels. Moreover, the absorber pins are subjected to the action of the pressurized coolant which circulates in the upper portion of the reactor, that is to say in the zone in which the absorber pins are located when they are withdrawn from the fuel assemblies. It is therefore also necessary to protect the pins against the effects of this coolant flow.

The method which is usually adopted for guiding each control rod consists in placing the absorber-pin cluster together with the guide stem inside vertical wrapper tubes of square cross-section which are fitted with internal perforated guide plates having lower extensions in the form of braced and split guide tubes. Said guide tubes (corresponding in number to the absorber pins in the control rod) are slidably mounted in the bottom plate which serves as a bearing member for the fuel assemblies. The bottom plate is rigidly fixed to the top plate by means of spacer columns which are pierced by lateral openings in order to permit the flow of coolant.

This design solution calls for highly accurate positioning of the split guide tubes in order to ensure that the absorber pins are maintained in accurate positional relation. Moreover, this structure is highly sensitive to vibrations.

SUMMARY OF THE INVENTION

The present invention is precisely directed to a nuclear reactor in which the device for guiding control rods overcomes the disadvantages mentioned in the foregoing, especially by dispensing with the need for split guide tubes.

The nuclear reactor essentially comprises a pressure vessel provided with nozzles for the admission and discharge of a coolant liquid and containing the reactor core, and a device for guiding control rods of the pin-cluster type, said device being located within the reactor vessel above the core and comprising a top rigid plate applied at its periphery against said reactor vessel, a plurality of long vertical tubes having a suficiently large cross-sectional area to permit the entire control rod assembly to pass therethrough, the upper extremities of said long tubes being secured to the top plate opposite to apertures formed in said plate and the lower extremities of said long tubes being secured to an intermediate plate placed at a level below the outlet nozzles and provided opposite to each hollow tube with apertures substantially equal in diameter to the control-rod pins and equal in number to said pins, a bottom plate connected mechanically to the intermediate plate, and short tubes which are rigidly fixed to the intermediate plate opposite to each aperture of said plate and which open at the lower ends thereof into corresponding openings of the bottom plate, the intermediate and bottom plates being pierced by apertures for the flow of coolant.

In a first embodiment, the short tubes are rigidly fixed to the bottom plate at the lower ends thereof and have a sufficient thickness to provide a mechanical connection between the intermediate plate and the bottom plate.

In a first alternative embodiment, said short tubes each have a thin wall and the lower extremities thereof slide freely within apertures formed in the bottom plate and said plates are connected to each other by means of mechanical components.

In a second alternative embodiment, the mechanical connection between the intermediate plate is obtained by means of solid supporting members connected to both plates and pierced by apertures which perform the function of the short tubes.

BRIEF DESCRIPTION OF THE DRAWINGS

A clearer understanding of the invention will in any case be gained from the following description of one embodiment of the invention which is given by way of example but not in any sense by way of limitation, reference being made to the accompanying figures, in which.

DETAILED DESCRIPTION OF PREFERRED EMBODIMENTS

Figure 2:
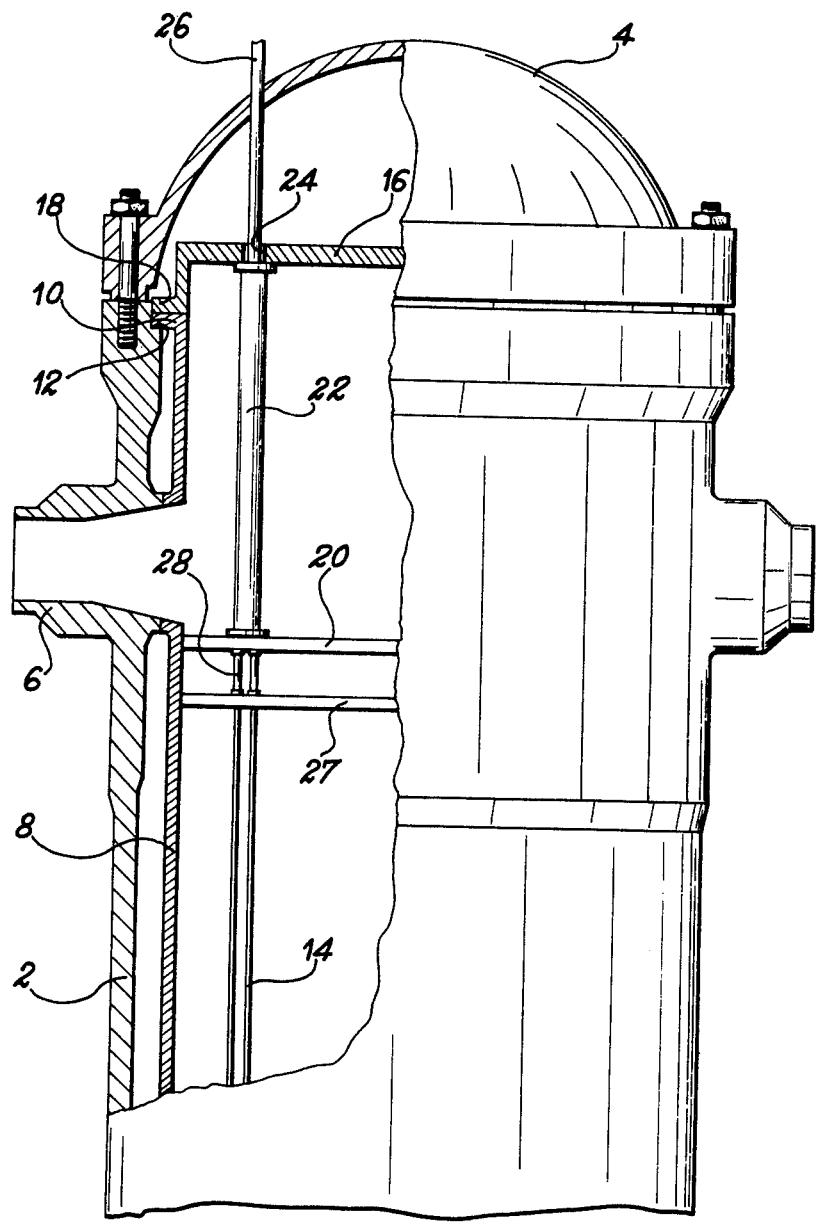
FIG. 2 is a view in elevation showing the top portion of a pressurized-water reactor and the positional arrangement of the device in accordance with the invention.

The upper portion of the reactor vessel is illustrated in elevation and partly in cross-section in FIG. 2 in order to show the position-location of the guiding device in accordance with the invention. There can be seen in this figure the reactor vessel 2 which is closed at the top by means of a lid 4. The vessel 2 is provided with outlet nozzles such as the nozzle 6 which permit withdrawal of the coolant (such as water, for example) after this latter has passed through the reactor core. The core is placed within a cylindrical shell 8 or basket which is applied against the vessel 2 by means of the flange 10 of said basket 8 and by means of the stepped recess 12 formed in the reactor vessel 2. The reactor core proper is constituted by a plurality of fuel assemblies as designated by the reference 14 and consisting of fuel elements in which passages are formed between these latter in order to permit the displacement of the control-rod absorber pins.

This figure shows the main elements of the guiding device, including a so-called top support plate 16 which is applied against the flange 10 of the basket 8 by means of a peripheral flange 18. The top support plate as a whole is therefore applied at its periphery against the reactor vessel 2. The guiding device also comprises an intermediate plate 20 located slightly below the coolant water outlet nozzles. The intermediate plate is connected to the top plate 16 by means of hollow tubes of substantial length such as the tube 22 within which the control rods are capable of sliding and which have their openings in apertures formed in the top support plate 16 such as, for example, the aperture 24. Said tubes have extensions in the form of control rod drive mechanisms as designated by the reference 26 which pass through the reactor lid 4. Finally, the guiding device comprises a bottom plate 27 which is usually referred to as the top core plate. This plate serves to lock the fuel assemblies 14 in position at the upper extremities of these latter and is connected to the intermediate plate 20 by means of spacer tubes such as the tube 28.

Figure 3:
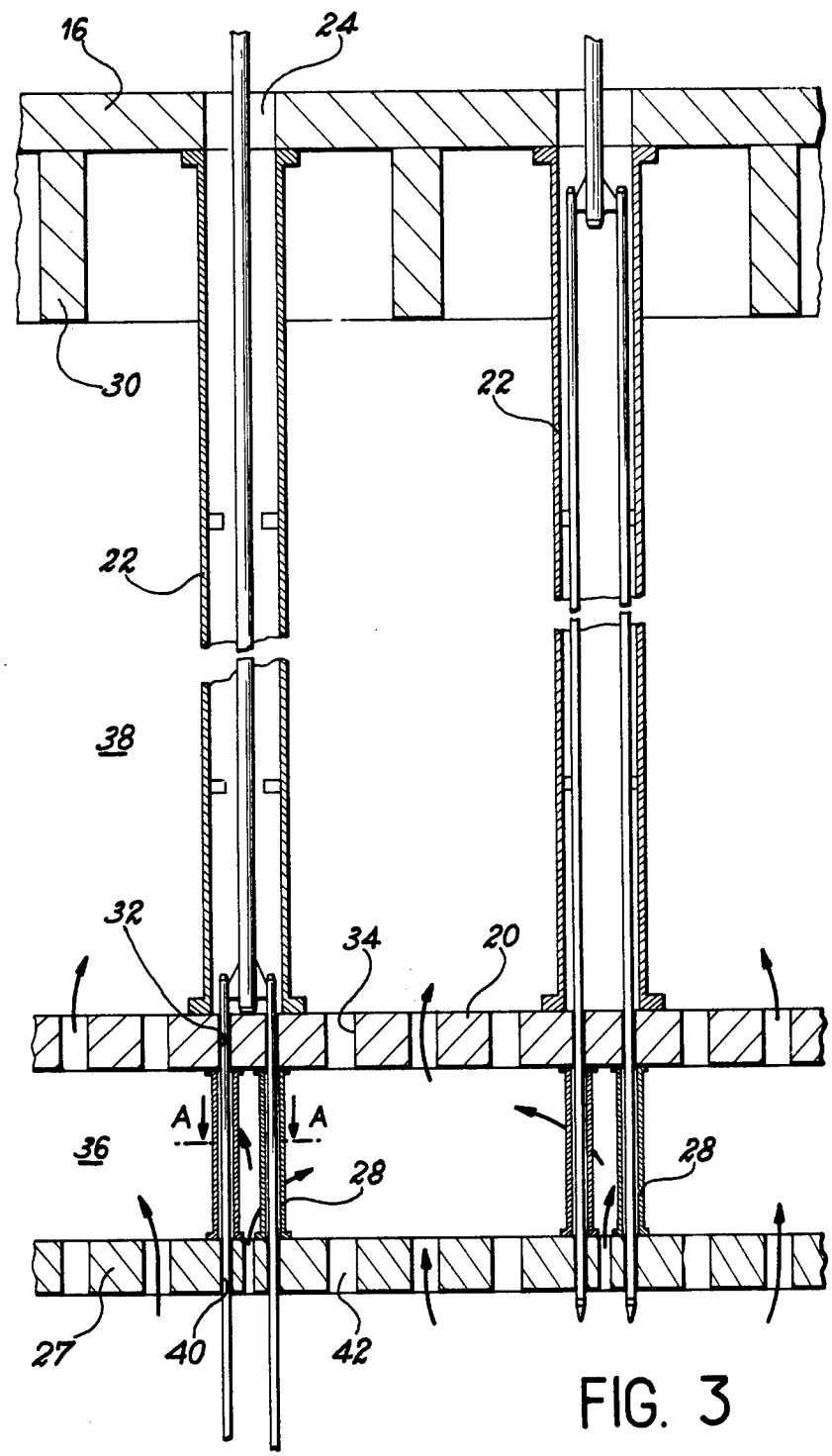
FIG. 3 is a view in elevation showing one form of construction of the device.

A better understanding of the structure of the control-rod guiding device will be understood by referring to FIG. 3. As mentioned earlier, the top support plate 16 is applied at its periphery against the reactor vessel and supports the complete guiding device. Said top plate must therefore have a high degree or rigidity and is accordingly provided with ribs such as the rib 30. The guide tubes 22 in which the control rod assembly is intended to move preferably have a square cross-section. Any known means are adopted in order to secure the upper extremities of the guide tubes to the top support plate 16 and the lower extremities of said guide tubes to the intermediate plate 20. The upper extremities of the guide tubes 22 open into an aperture 24 formed in the plate 16. The intermediate plate 20 is provided opposite to each guide tube 22 with apertures such as 32 which are equal in number to the absorber pins of the control rod. These apertures clearly have a sufficient diameter to permit the displacement of said pins. The intermediate plate 20 is also provided with apertures such as 34 through which the coolant water (or more generally the coolant liquid) is permitted to pass from the zone 36 (located between the plates 27 and 20) towards the upper zone 38 in conjunction with the coolant discharge nozzles 6. The tubes 28 which are employed for the purpose both of guiding the absorber pins and of providing a mechanical connection between the plates 20 and 27 are secured at the top to the plate 20 and at the bottom to the plate 27. It is apparent that the upper extremities of said tubes open into the apertures 32 of the plate 20 and that their lower extremities open into the corresponding apertures 40 of the plate 27. Said apertures 40 have the same diameter and the same arrangement as the apertures 32 of the plate 20. The plate 27 is very close to the fuel elements and serves as a bearing member for these latter. The holes 42 formed in said plate serve as passageways for the water and must therefore be uniformly spaced in order to ensure that the water outlets located opposite to some fuel elements are not shut off.

Figure 1:
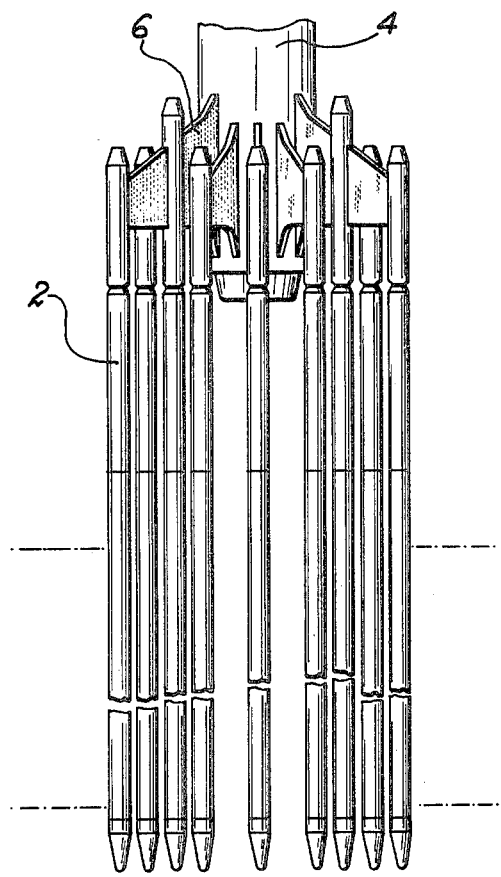
FIG. 1 is a perspective view showing a control rod of the pin-cluster type described above and which is in the prior art.
Figure 4:
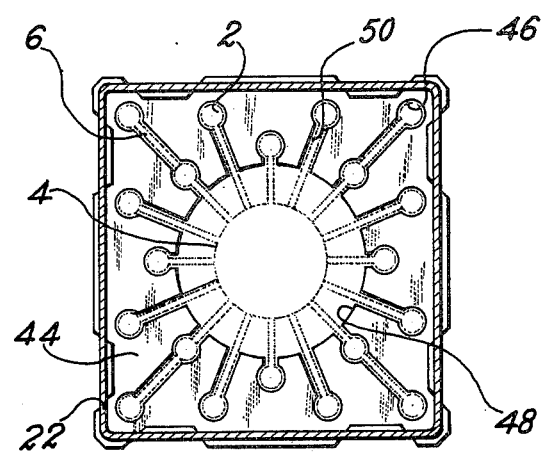
FIG. 4 is a horizontal sectional view of a control-rod guiding device showing a guide plate.

The tubes 22 are fitted with a plurality of guide plates 44 in vertically spaced relation, the shape of a typical plate being shown in the top view of FIG. 4.

The guide plate 44 is attached to the wall of the tube 22 along the periphery of said plate and is pierced by orifices such as the orifice 46, the diameter of which is slightly larger than that of the absorber pins 2 (which are shown in dotted outline). The plate 44 is provided with a central opening 48 of larger diameter which permits the transfer of the guide stem 4 (also shown in dotted outline in FIG. 4). The central opening 48 is joined to the orifices 46 by means of radial slots such as the slot 50 which permit the insertion of the spider ribs 6.

It has been mentioned in the foregoing description that the short tubes 28 served on the one hand to guide the absorber pins and on the other hand to secure the plates 20 and 27 to each other. In an alternative form of construction, the tubes 28 are obtained by drilling holes in the longitudinal direction in elements having different shapes (such as ribs or cylinders) and rigidly fixed to the plates 20 and 27.

Figure 4A:
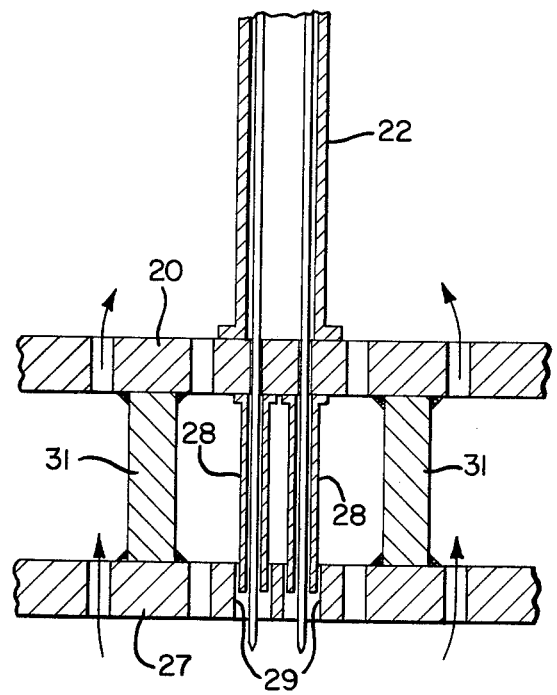
FIG. 4A is an elevation view, partially in section, similar to a portion of FIG. 3 showing an alternate embodiment.

In another form of construction, as shown in FIG. 4A, guiding of the absorber pins and interconnection of the plates 20 and 27 are separate functions. Guiding is carried out by means of the thin-walled tubes 28, the upper extremities of which are secured to the plate 20 and the lower extremities of which slide freely within apertures 29 formed for this purpose in the plate 27. The connection between the two plates is achieved by means of any suitable elements 31 (such as ribs, full or perforated tubes, cruciform members and the like) which are rigidly fixed to the plates 20 and 27 by welding or mechanical assembly.

Figure 5:
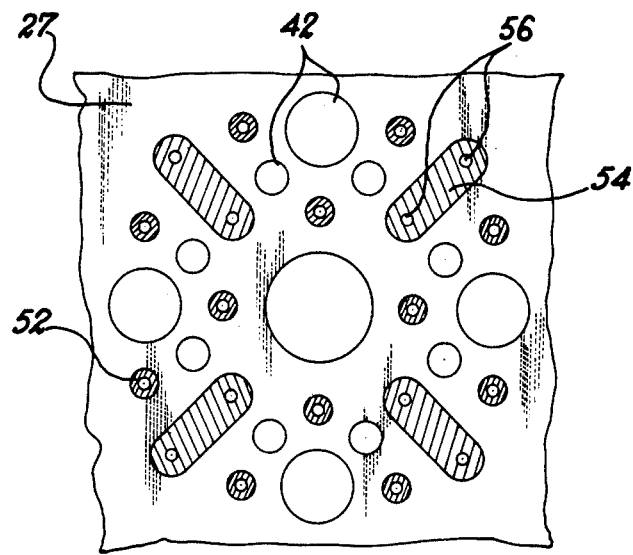
FIG. 5 is a top view in horizontal cross-section taken along the plane A—A of FIG. 3 and showing a control-rod guiding element.

FIG. 5 is a top view taken in cross-section along the plane A—A of FIG. 3 and shows the first alternative form of construction in which provision is made both for thick-walled tubes such as the tube 52 and for ribs such as the rib 54 having drilled holes such as the hole 56. Such a construction can be formed by welding the tubes 52 and the ribs 54 to the plates 20, 27. The tubes 52 can be formed, as described above, by welding solid rods between the plates 20, 27, and then drilling holes through the plates and rods. The holes 56 in the ribs 54 can likewise be formed by drilling them through the ribs and plates after the ribs are welded in place.

The space h between the plates 20 and 27 is preferably of minimum value in order to ensure enhanced rigidity and strength of the connection between the plates and to reduce the dead height above the reactor core. The value of h is governed by the distance which is necessary in order to ensure that the water which is discharged from the plate 27 is permitted to flow through the plate 20 at a distance from the zones corresponding to the locations of the long tubes 22. A height h of the order of 10 to 20 cm appears to be sufficient. One of the main advantages of the invention arises precisely from the small value of the distance h between the plates 27 and 20. In fact, the small thickness of the mechanically joined and welded assembly formed by the elements 27, 20 and 28 makes it possible after welding to form the absorber-pin guides with both ease and precision by machining through the spacer tubes 28.

It is possible to join together a number of absorber-pin clusters located in fuel elements in adjacent relation to a single spider by ensuring that the cross-sectional area of the tubes 22 is increased accordingly.

This reduces the possibility of deformation in the tubes and allows the plates to be connected more rigidly than is possible in prior art devices. In addition, the height of the vessel is significantly decreased because the distance above the outlet openings is decreased. This is due to the fact that the rods can be fully retracted from the guide tubes below the outlet openings.

I claim:

1. An improvement in a nuclear reactor which comprises a vessel having an inlet for receiving a coolant, a plurality of outlets spaced around the walls of the vessel for discharging said coolant, a reactor core disposed in said vessel and including a plurality of fuel assemblies, and a plurality of absorbing pins for cooperating with said fuel assemblies for regulating the neutron flux within said core, the improvement comprising an apparatus for guiding and supporting said pins in said vessel, said apparatus including a rigid top plate located in the upper portion of said vessel, said top plate having a plurality of apertures extending therethrough of a size sufficient to accommodate an assembly of said pins, an intermediate plate located in said vessel below said outlets, a bottom plate disposed between said intermediate plate and the bottom of said vessel, the top, intermediate and bottom plates being disposed above said core and being sized at least large enough to cover the reactor core, a plurality of elongated hollow members each having a cross-sectional shape and area sufficient to accommodate an assembly of said pins, the upper end portions of said members being secured to said top plate in registry with the apertures formed through said top plate, the lower end portions of said hollow members being connected to said intermediate plate, the intermediate and bottom plates including a pattern of apertures therein aligned with each of said hollow members each of said apertures being adapted to receive one of said pins therethrough, the apertures in the intermediate and bottom plates being aligned with each other and connected by a plurality of support members with openings therein in register with said apertures, the support members being rigidly connected to each of said intermediate and bottom plates for supporting the bottom plate relative to the intermediate plate.

2. The improvement in claim 1, wherein the inlet is located below the bottom plate, and a plurality of additional apertures are formed through said bottom and intermediate plates to direct coolant through said vessel in a direction parallel to said tubes and out said outlets.

3. The improvement in claim 1, wherein the support members include a plurality of ribs with each including more than one opening therein.

4. The improvement in claim 1, wherein the support members include a plurality of rods with axial openings therethrough.

5. The improvement in claim 1, wherein the support members are solid when they are connected to the intermediate and bottom plates, the openings being formed therein after connection takes place.

6. An improvement in a nuclear reactor which comprises a vessel having an inlet for receiving a coolant, a plurality of outlets spaced around the walls of the vessel for discharging said coolant, a reactor core disposed in said vessel and including a plurality of fuel assemblies, and a plurality of absorbing pins for cooperating with said fuel assemblies for regulating the neutron flux within said core, the improvement comprising an apparatus for guiding and supporting said pins in said vessel, said apparatus including a rigid top plate located in the upper portion of said vessel above said outlets and secured to the inner wall of said vessel, said top plate having a plurality of apertures extending therethrough of a size sufficient to accommodate an assembly of said pins, an intermediate plate located in said vessel below said outlets, a bottom plate disposed between said intermediate plate and the bottom of said vessel, the top, intermediate and bottom plates being disposed above said core and being sized at least large enough to cover the reactor core, a plurality of elongated hollow members each having a cross-sectional shape and area sufficient to accommodate an assembly of said pins, the upper end portions of said members being secured to said top plate in registry with the apertures formed through said top plate, the lower end portions of said hollow members being connected to said intermediate plate, the intermediate and bottom plates including a pattern of apertures therein aligned with each of said hollow members each of said apertures being adapted to receive one of said pins therethrough, the apertures in the intermediate and bottom plates being aligned with each other and connected by a plurality of connecting tubes with openings therein in register with said apertures, the connecting hollow members being rigidly connected to the intermediate plate and freely slidable in the apertures of the bottom plate, a plurality of support members rigidly connected to the intermediate and bottom plates and extending therebetween for supporting the bottom plate relative to the intermediate plate.

7. The improvement in claim 6, wherein the inlet is located between the bottom plate, and a plurality of additional apertures are formed through said bottom and intermediate plates to direct coolant through said vessel in a direction parallel to said tubes and out said outlets.

* * * * *